United States Patent
Schmalenberg et al.

(10) Patent No.: US 11,840,161 B2
(45) Date of Patent: Dec. 12, 2023

(54) SEAT BLOCKING SYSTEM AND METHOD

(71) Applicant: Toyota Motor Engineering & Manufacturing North America, Inc., Plano, TX (US)

(72) Inventors: Paul Donald Schmalenberg, Pittsburgh, PA (US); Ercan Mehmet Dede, Ann Arbor, MI (US); Frederico Marcolino Quintao Severgnini, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 475 days.

(21) Appl. No.: 17/200,150

(22) Filed: Mar. 12, 2021

(65) Prior Publication Data
US 2022/0289077 A1    Sep. 15, 2022

(51) Int. Cl.
*B60N 2/04*    (2006.01)
*B60N 2/02*    (2006.01)
*G06Q 10/20*    (2023.01)
*G06Q 10/02*    (2012.01)

(52) U.S. Cl.
CPC ............ *B60N 2/04* (2013.01); *B60N 2/0244* (2013.01); *G06Q 10/02* (2013.01); *G06Q 10/20* (2013.01); *B60N 2/0268* (2023.08)

(58) Field of Classification Search
CPC ...... B60N 2/04; B60N 2/0244; B60N 2/0268; B60N 2/64; G06Q 10/02; G06Q 10/20
See application file for complete search history.

(56) References Cited

U.S. PATENT DOCUMENTS

| | | | |
|---|---|---|---|
| 9,481,309 B2* | 11/2016 | Sakarian | B60R 7/043 |
| 10,081,298 B2 | 9/2018 | Stanfield et al. | |
| 10,131,282 B2* | 11/2018 | Huebner | B60N 2/00 |
| 10,427,553 B2* | 10/2019 | Bonk | B60N 2/0228 |
| 10,611,314 B2 | 4/2020 | Tait | |
| 10,632,866 B2* | 4/2020 | Benson | B60N 2/914 |

(Continued)

OTHER PUBLICATIONS

Wang et al., "Deployable Soft Composite Structures," Scientific Reports 6, 20869, Feb. 2016, pp. 1-10 (11 total pages).

(Continued)

*Primary Examiner* — Lori Lyjak
(74) *Attorney, Agent, or Firm* — Christopher G. Darrow; Darrow Mustafa PC

(57) ABSTRACT

A seat blocking system can comprise a seat. The seat can include a seat understructure and an overlying seating surface. The seat understructure can form a seat base and a seatback arranged in a seating configuration. The seating surface can be configured to morph between a sittable shape, in which the seating surface is coextensive with the seat understructure, and an unsittable shape, in which the seating surface is expanded over at least a portion of the seat understructure. The seat blocking system can include a seat blocker. The seat blocker can be integrated with the seat. The seat blocker can be operable to morph between a deactivated state, whereby the seat blocker leaves the seat understructure to impart the sittable shape to the seating surface, and an activated state, in which the seat blocker acts on the seating surface to impart the unsittable shape to the seating surface.

12 Claims, 3 Drawing Sheets

(56) References Cited

U.S. PATENT DOCUMENTS

| | | | |
|---|---|---|---|
| 10,647,286 B1 | 5/2020 | Dennis et al. | |
| 10,967,764 B2* | 4/2021 | Fowler | B60R 7/043 |
| 2006/0061152 A1* | 3/2006 | Pudney | B60R 7/043 |
| | | | 297/188.21 |
| 2014/0167463 A1* | 6/2014 | Sakata | B60N 2/914 |
| | | | 297/284.3 |
| 2018/0118054 A1* | 5/2018 | Devilbiss | B60N 2/914 |
| 2019/0344707 A1 | 11/2019 | Nelson et al. | |
| 2020/0238854 A1* | 7/2020 | Gandhi | B60N 2/99 |
| 2020/0245772 A1 | 8/2020 | Lee | |
| 2020/0247274 A1* | 8/2020 | Gandhi | B60N 2/99 |

OTHER PUBLICATIONS

Chen et al., "Autonomous Deployment of a Solar Panel Using Elastic Origami and Distributed Shape-Memory-Polymer Actuators," Physical Review Applied 11, 064069, Jun. 28, 2019, pp. 1-16 (16 pages).

\* cited by examiner

SEAT BLOCKING SYSTEM AND METHOD

TECHNICAL FIELD

The embodiments disclosed herein relate to seats and, more particularly, to a system and method for blocking a person from sitting in a seat.

BACKGROUND

Ride-sharing and carpooling are becoming more popular modes of transportation as the use of autonomous vehicles increases. These ride-sharing vehicles allow multiple people to share rides to their respective destinations. Accordingly, autonomous ride-sharing vehicles can include a passenger compartment having seats for transporting passengers to and from various locations. In some instances, a passenger may leave a seat too unclean for a subsequent passenger to sit in. In other instances, a passenger may reserve a seat in the vehicle.

SUMMARY

Disclosed herein are embodiments of a seat blocking system. In one aspect, a seat blocking system can comprise a seat. The seat can include a seat understructure and an overlying seating surface. The seat understructure can form a seat base and a seatback arranged in a seating configuration. The seating surface can be configured to morph between a sittable shape, in which the seating surface is coextensive with the seat understructure, and an unsittable shape, in which the seating surface is expanded over at least a portion of the seat understructure. The seat blocking system can include a seat blocker. The seat blocker can be integrated with the seat. The seat blocker can be operable to morph between a deactivated state, whereby the seat blocker leaves the seat understructure to impart the sittable shape to the seating surface, and an activated state, in which the seat blocker acts on the seating surface to impart the unsittable shape to the seating surface. These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a seat blocking system for blocking a person from sitting in a seat. The seat blocking system can be used in any suitable type of seat. As described herein, the seat blocking system can be used in a vehicle seat. For example, the seat blocking system can be used in a ride-sharing vehicle to prevent a passenger from sitting in a seat of the vehicle if the seat is unclean or if the seat is reserved.

Figure 1:
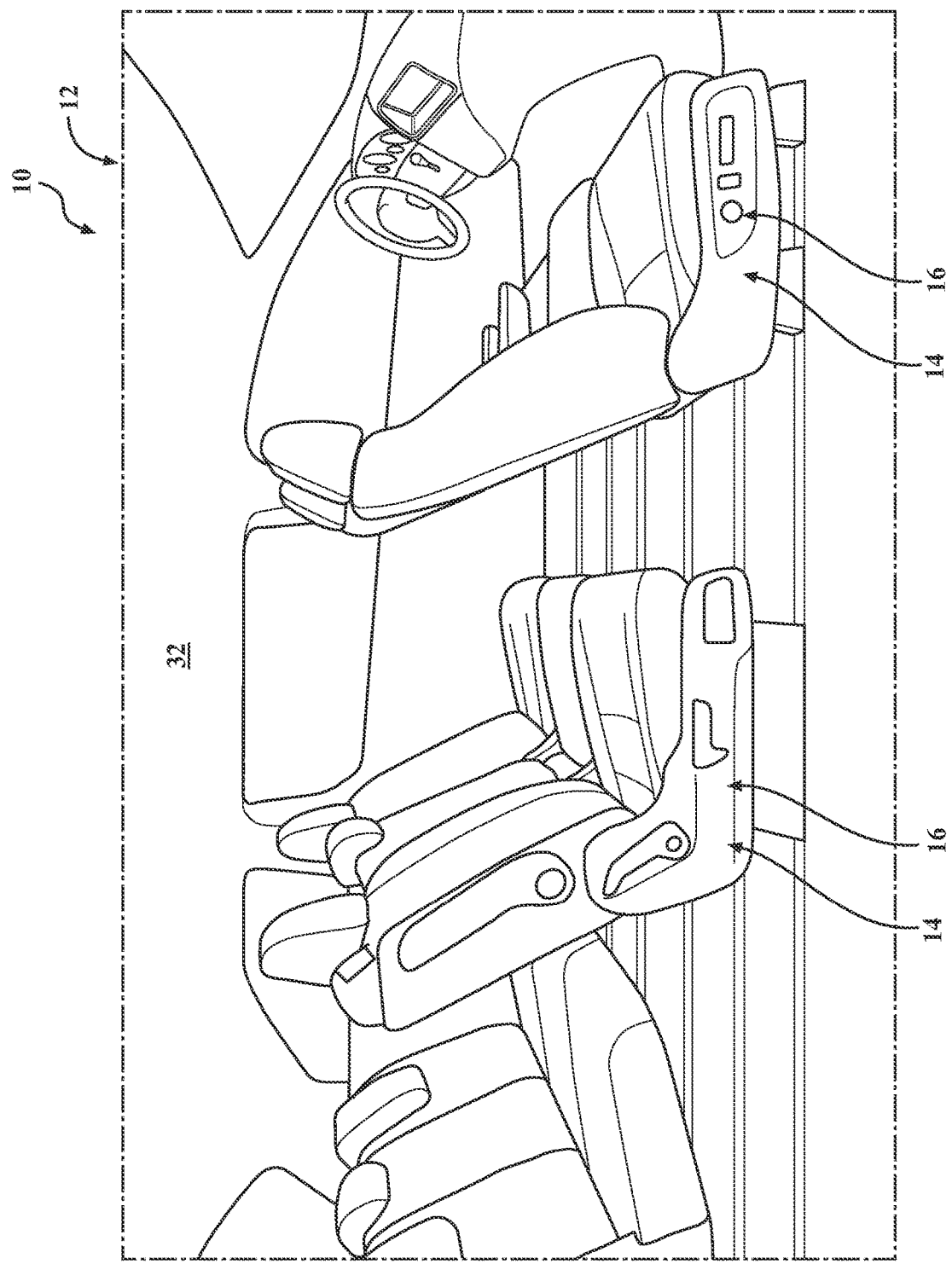
FIG. 1 is an example of a passenger compartment of a vehicle.

Part of a passenger vehicle 10 is shown in FIG. 1. In this description, uses of "front," "forward," and the like, and uses of "rear," "rearward," and the like, refer to the longitudinal directions of the vehicle 10. "Front," "forward," and the like refer to the front (fore) of the vehicle 10, while "rear," "rearward," and the like refer to the back (aft) of the vehicle 10. Uses of "side," "sideways," "transverse," and the like refer to the lateral directions of the vehicle 10. Uses of "above," "below," and the like refer to the vertical directions of the vehicle 10.

The vehicle 10 includes an exterior and a number of interior compartments. The compartments include a passenger compartment 12, an engine compartment, a cargo area and the like. Among other things, the vehicle 10 includes seats 14, a dash assembly, an instrument panel, controls, and the like housed in the passenger compartment 12. Additionally, the vehicle 10 includes an engine, a motor, a transmission, and the like, as well as other powertrain components, such as wheels, housed in the engine compartment and elsewhere in the vehicle 10. The wheels support the remainder of the vehicle 10 on the ground. One, some or all of the wheels are powered by the remainder of the powertrain components to drive the vehicle 10 along the ground.

The vehicle 10 can be any suitable vehicle. In one example, the vehicle 10 is an autonomous vehicle. Specifically, the vehicle 10 is an autonomous a ride-sharing vehicle, Mobility as a Service (MaaS) vehicle, e-palette, or any other type of autonomous public transportation vehicle. The vehicle 10 may be scheduled to make a trip to transport passengers to and from various locations. The vehicle 10 may pick-up passengers at various locations along the trip, and the vehicle 10 may drop-off passengers at various locations along the trip. The vehicle 10 may stop at a service station to be cleaned at one or more scheduled times along the trip, or before or after a trip. In some instances, a passenger may leave a seat 14 unclean after using it, for example, by leaving dirt or a spill on the seat 14. As such, while the seat 14 may be too unclean for a passenger to sit in, the vehicle 10 may not be scheduled to be cleaned before picking up other passengers. In other instances, a seat 14 may be reserved by a passenger. In these and other instances, the seat 14 can be configured to block a passenger from sitting thereon. Accordingly, the seat 14 has a seat blocking system 16. The seat blocking system 16 can be activated to prevent a passenger from sitting in the seat 14. For brevity, this description follows with reference to a seat blocking system 16 for one seat 14 of the vehicle 10. By extension, this description follows with reference to the other seats 14 of the vehicle 10.

The seat blocking system 16 includes one or more components of the seat 14 itself. As shown with reference to FIGS. 2A and 2B, the seat 14 has a seat understructure 18, including a frame and one or more seat cushions. The seat understructure 18 forms a seat base 20 and a seatback 22 arranged in a seating configuration (i.e., the seat base 20 has a horizontal orientation and the seatback 22 has an upright orientation). The seat 14 also has an overlying seating surface 24, which covers one or more portions of the seat understructure 18, including along the seat base 20 and/or the seatback 22. The seating surface 24 can be the fabric of the seat 14, or the seating surface 24 can be a separate cover overlying one or more portions of the seat 14.

Figure 2A:
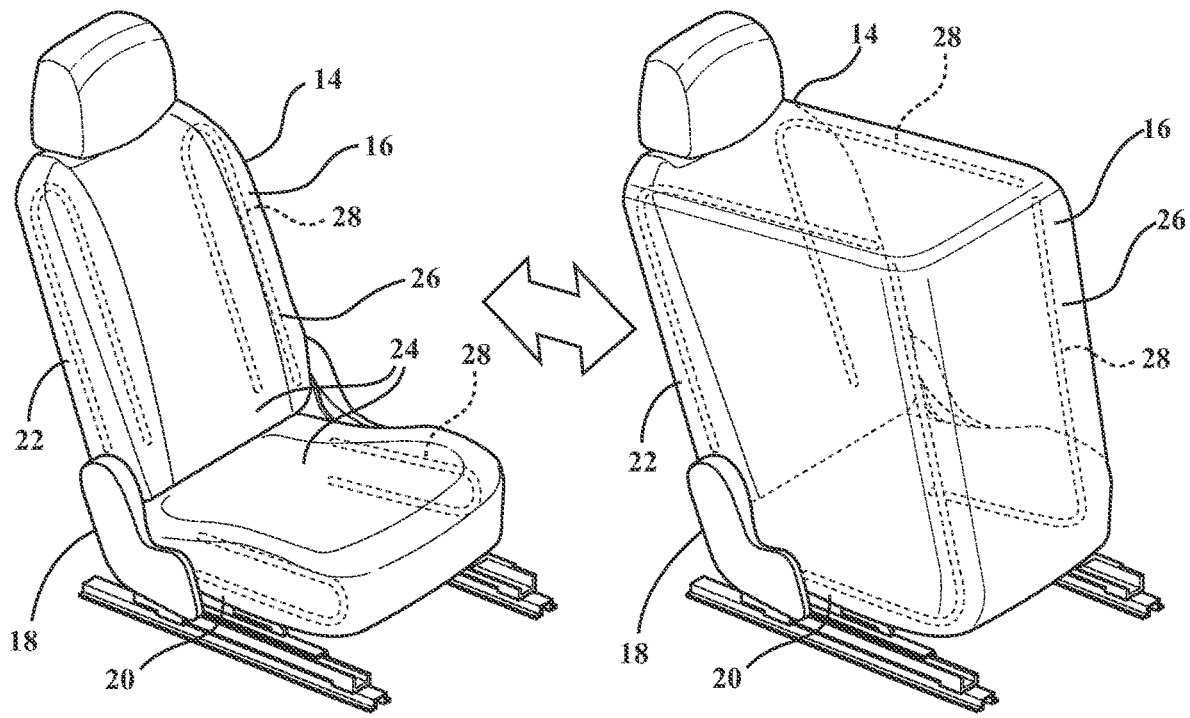
FIG. 2A is an example of a seat blocker.
Figure 2B:
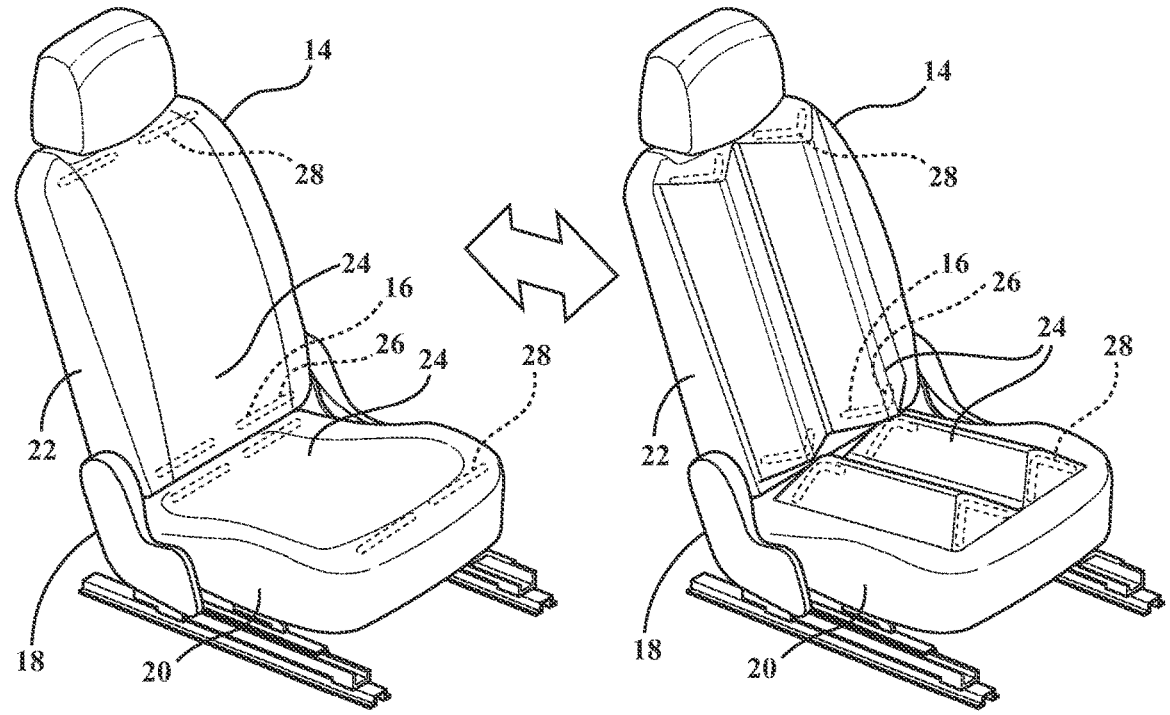
FIG. 2B is an example of a seat blocker.

The seating surface 24 is configured for deployment between a sittable shape, represented on the left in FIGS. 2A and 2B, and an unsittable shape, represented on the right in FIGS. 2A and 2B. In the sittable shape, the seating surface 24 is substantially coextensive with the seat understructure 18. Accordingly, in the sittable shape, the seat 14 is configured to allow a passenger to sit thereon. In the unsittable shape, the seating surface 24 is expanded over at least a portion of the seat understructure 18. Accordingly, in the unsittable shape, the seat 14 is configured to prevent a passenger from sitting thereon.

In order to deploy the seating surface 24 between the sittable shape and the unsittable shape, the seat blocking system 16 includes a seat blocker 26 integrated with the seat 14. To drive the deployment of the seating surface 24 between the sittable shape and the unsittable shape, the seat blocker 26 acts on the seating surface 24 under the operation of the seat blocking system 16. Accordingly, the seat blocker 26 is a substantially rigid structure integrated with the seat understructure 18 and located under the seating surface 24. The seat blocker 26 is configured for activation between a deactivated state, represented on the left in FIGS. 2A and 2B, and an activated state, represented on the right in FIGS. 2A and 2B. In the deactivated state, the seat blocker 26 is not operated, and thus, the seating surface 24 maintains the sittable shape. In the activated state, the seat blocker 26 is operated and acts on the seating surface 24 to impart the unsittable shape to the seating surface 24.

During operation of the seat blocker 26 between the deactivated state and the activated state, the seating surface 24 is configured to progressively change shape, or morph, between the sittable shape and the unsittable shape. Specifically, during operation of the seat blocker 26 from the deactivated state to the activated state, the seating surface 24 morphs from the sittable shape to the unsittable shape. Similarly, during operation of the seat blocker 26 from the activated state to the deactivated state, the seating surface 24 morphs from the unsittable shape to the sittable shape.

In order to morph between the sittable shape and the unsittable shape, the seating surface 24 can be made from any combination of durable but stretchable materials or other structures suitable for serving as part of the seat 14. The seating surface 24 may, for instance, be made in whole or in part from nylon material. As such, during operation of the seat blocker 26 between the deactivated state and the activated state, the seating surface 24 is configured to undergo the requisite progressive changes in exterior surface area as it morphs between the sittable shape and the unsittable shape. Specifically, during operation of the seat blocker 26 from the deactivated state to the activated state, the seating surface 24 undergoes a progressive increase in exterior surface area as it morphs from the sittable shape to the unsittable shape. Similarly, during operation of the seat blocker 26 from the activated state to the deactivated state, the seating surface 24 undergoes a progressive decrease in exterior surface area as it morphs from the unsittable shape to the sittable shape.

In order to operate the seat blocker 26, the seat blocking system 16 includes one or more actuators 28. The actuator(s) 28 can be a part of the seat blocker 26. Accordingly, the seat blocker 26 can be formed in whole or in part from the actuator(s) 28. For purposes of operating the seat blocker 26 between the deactivated state and the activated state, the actuator(s) 28 are configured to bend between the deactivated state and the activated state. Accordingly, the actuator(s) 28 can be bending-type actuators. In other words, the actuator(s) 28 can be operated by bending action. When operated, the actuator(s) 28 can bend, thereby morphing the seat blocker 26 between the deactivated state and the activated state, and thereby morphing the seating surface 24 between the sittable shape and the unsittable shape.

The actuator(s) 28 can have any suitable configuration. As shown with reference to FIG. 2A (left), the actuator(s) 28 can be arranged in a doubled-over shape. For example, the actuator(s) 28 can resemble an elongated U-shape. The actuator(s) 28 can be arranged longitudinally along the seat base 20 and/or the seatback 22. When actuated, the actuator(s) 28 can bend from the doubled-over, U-shape to resemble an L-shape, as shown in FIG. 2A (right). When actuated to the L-shape, the actuator(s) 28 can expand the seating surface 24, thereby stretching the seating surface 24 to a box-like shape over the seat base 20 and/or the seatback 22. Alternatively, or additionally, as shown with reference to FIG. 2B (left), the actuator(s) 28 can be arranged in a substantially straight shape. The actuator(s) 28 can be arranged transversally across the seat base 20 and/or the seatback 22. When actuated, the actuator(s) 28 can bend from the substantially straight shape to a substantially inverted V-shape. The inverted V-shape can extend above the seat base 20 and/or seatback 22. When actuated to the inverted V-shape, the actuator(s) 28 expand the seating surface 24, thereby stretching the seating surface 24 to a wave-like shape over the seat base 20 and/or the seatback 22.

All or part of the actuator(s) 28 can include any suitable type of actuator(s). For example, the actuator(s) 28 can be actuated using electrical energy, for example, the actuator(s) 28 can be shape memory alloys (SMAs), electroactive polymers (EAPs), and/or hydraulically amplified self-healing. electrostatic (HASEL) actuators. In other examples, the actuator(s) 28 can be actuated using air, for example, the actuator(s) 28 can be soft pneumatic actuators (SPAs) and/or fabric soft pneumatic actuators (FSPAs). In other examples, the actuator(s) 28 can be actuated using light, heat, and/or electrical energy, for example, the actuator(s) 28 can be liquid crystal elastomers (LCEs).

Figure 3:
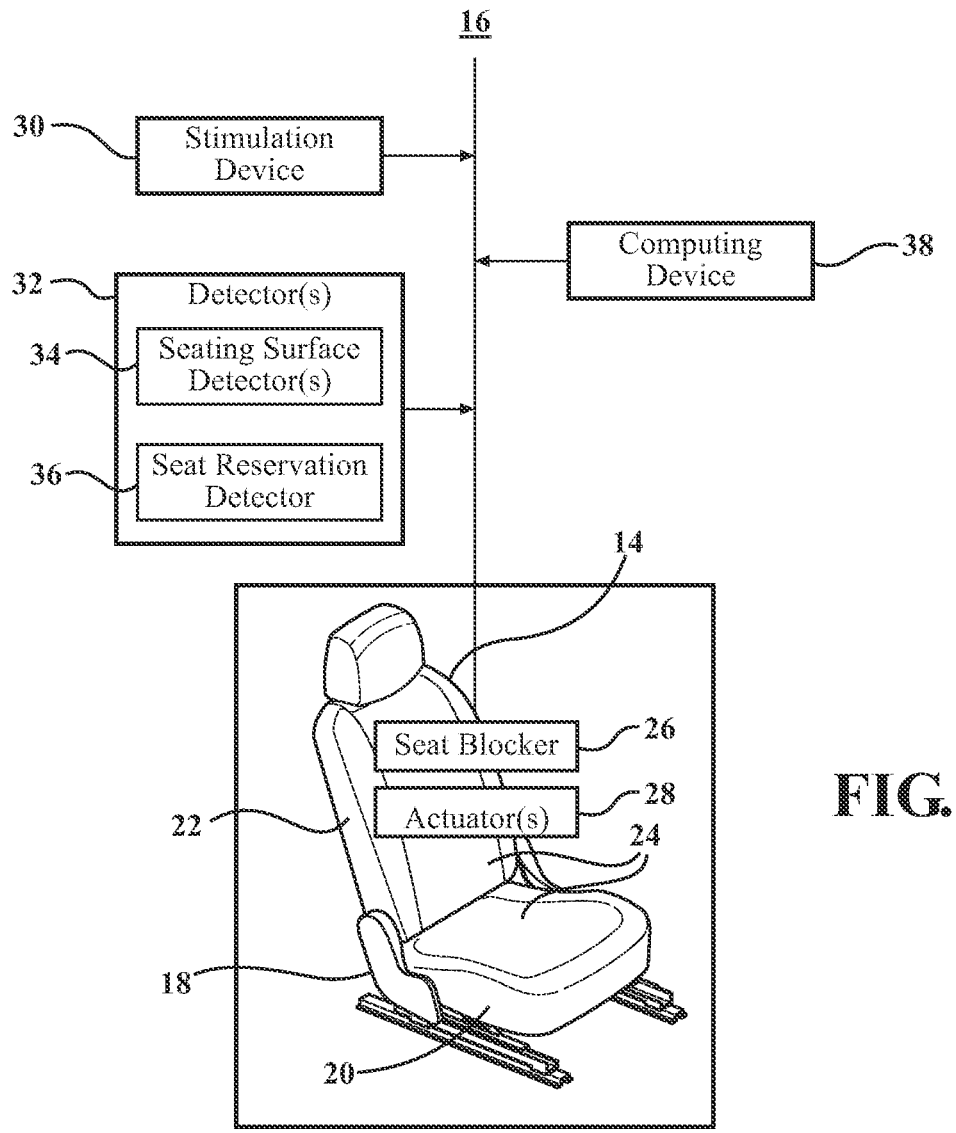
FIG. 3 is an example of a seat blocking system.

With reference to FIG. 3, the seat blocking system 16 includes various components for driving deployment of the seat blocker 26 between the deactivated state and the activated state. As a part of these components, the seat blocking system 16 includes a stimulation device 30. The stimulation device 30 can be provided on the seat 14 or provided separate from the seat 14. The stimulation device 30 is coupled to the actuator(s) 28. In order to deploy the seat blocker 26 between the deactivated state and the activated state, the stimulation device 30 is operable to generate and apply the requisite stimuli to the actuator(s) 28. The stimulation device 30 may, for instance, include any combination of an electrical energy generation device, an air generation device, a light generation device, a heat generation device, and/or the like. Specifically, to drive the deployment of the seat blocker 26 from the deactivated state to the activated state, the stimulation device 30 is operated to apply the requisite stimulus to the actuator(s) 28, to which the actuator(s) 28 are responsive to bend from the deactivated state to the activated state. Similarly, to drive the deployment of the seat blocker 26 from the activated state to the deactivated state, the stimulation device 30 is operated to apply the requisite stimulus to the actuator(s) 28, to which the actuator(s) 28 are responsive to bend from the activated state to the deactivated state. In these and other examples, it will be understood that operating the stimulation device 30 to apply a requisite stimulus to the actuator(s) 28 may include removing a previously-requisite and previously-applied stimulus.

In order to determine when to activate and deactivate the seat blocker 26, the seat blocking system 16 includes one or more detectors 32. The detector(s) 32 include a seating surface detector 34 for detecting information about the seating surface 24. The seating surface detector 34 is located in the passenger compartment 12 with a field of view of the seat 14, including the seating surface 24. The vehicle 10 can accordingly include a plurality of seating surface detectors 34, with each seating surface detector 34 configured to detect information about the seating surface 24 of each seat 14. The seating surface detector(s) 34 can be any suitable type of detector, for example, a camera, a LIDAR sensor, a RADAR sensor, or the like. The detector(s) 32 also include a seat reservation detector 36 for detecting information about whether a seat 14 is reserved or un-reserved by a passenger. For example, the seat reservation detector 36 can receive a signal from a passenger, such as a signal from a mobile phone, that indicates that the seat 14 has been reserved or is un-reserved.

The detector(s) 32 can be configured to transmit data, signals, and/or other information to a computing device. Accordingly, the seat blocking system 16 includes a computing device 38 communicatively and operatively connected to the seat blocker 26 and its operable components. As used herein, the term "operatively connected" can include direct or indirect connections, including connections without direct physical contact. The seat blocking system 16 may operate the computing device 38 to operate the seat blocker 26 and its operable components to selectively deploy the seat blocker 26 between the deactivated state and the activated state. For example, the computing device 38 can selectively deploy the seat blocker 26 between the deactivated state and the activated state by selectively operating the stimulation device 30 to generate and apply the requisite stimuli to the actuator(s) 28. In some instances, the seat reservation detector 36 can be a part of the computing device 38.

The computing device 38 can be dedicated to operating the seat blocker 26, including the actuator(s) 28, or could additionally support the operation of other systems of the vehicle 10, for instance, as a part of a central control system therefor. The computing device 38 may include a processor communicatively coupled with a memory. The processor may include any device capable of executing machine-readable instructions, which may be stored on a non-transitory computer-readable medium, for example, the memory. The processor may include a controller, an integrated circuit, a microchip, a computer, and/or any other computing device.

The memory may include any type of computer readable medium suitable for storing data and algorithms. example, the memory may include RAM, ROM, a flash memory, a hard drive, and/or any device capable of storing machine readable instructions. Various algorithms and data for operating the seat blocker 26, the actuator(s) 28, and/or the stimulation device 30, may reside in whole or in part in the memory. The computing device 38 may, for instance, have a module residing in memory for operating the actuator(s) 28 to selectively deploy the seat blocker 26 between the deactivated state and the activated state.

The module may be configured to receive and analyze data, signals, and/or other information from the detector(s) 32 and/or the computing device 38, and identify a seat condition based on this information. The seat condition can be indicative of whether the seat 14 should be blocked. The seat condition can be a clean condition, an unclean condition, an un-reserved condition, and a reserved condition. The module identifies the clean condition when it determines that the seat 14 has a level of cleanliness that is suitable for a passenger to sit on. Similarly, the module identifies the unclean condition when it determines that the seat 14 has a level of cleanliness that is not suitable for a passenger to sit on. Moreover, the module identifies the un-reserved condition when it determines that the seat 14 has not been reserved by a passenger. Similarly, the module identifies the reserved condition when it determines that the seat 14 has been reserved by a passenger. The seat blocking system 16 can also include a central control center configured to receive the seat condition of each seat 14 of the seat blocking system 16. The computing device 38 can be configured to transmit the seat condition of each seat 14 of the seat blocking system 16 to the central control center.

The module may include instructions for operating the actuator(s) 28 to selectively deploy the seat blocker 26 from the deactivated state to the activated state based on the seat condition. For example, when the seat blocker 26 is in the deactivated state, and the module identifies the unclean condition or the reserved condition, the module can operate the actuator(s) 28 to selectively morph the seat blocker 26 to the activated state. Similarly, when the seat blocker 26 is in the activated state, and the module identifies the unclean condition or the reserved condition, the module can refrain from operating the actuator(s) 28 so that the seat blocker 26 remains in the activated state.

In another example, when the seat blocker 26 is in the activated state, and the module identifies the clean condition or the un-reserved condition, the module can operate the actuator(s) 28 to selectively morph the seat blocker 26 to the deactivated state. Similarly, when the seat blocker 26 is in the deactivated state, and the module identifies the clean condition or the un-reserved condition, the module can refrain from operating the actuator(s) 28 so that the seat blocker 26 remains in the deactivated state.

When the module identifies the reserved condition, the module can operate the actuator(s) 28 to selectively morph the seat blocker 26 from the activated state to the deactivated state in response to identification of a person holding the seat reservation. identification of the person holding the seat reservation may be accomplished through any suitable method. For example, the person holding the seat reservation may be identified based on the proximity to the seat 14 of a mobile device associated with the person. Proximity to the seat 14 of a mobile device associated with the person may be determined, for example, by the computing device 38. In another example, the person holding the seat reservation may be identified based on face recognition of that person. Face recognition may be performed, for example, by the detector(s) 32.

Now that the various potential systems, devices, elements, and/or components have been described, a method, including various possible steps of such method, will now be described. The method described may be applicable to the arrangements described above, but it is to be understood that the method can be carried out with other suitable systems and arrangements. Moreover, the method may include other steps that are not shown here, and in fact, the method is not limited to including every step shown. The blocks that are illustrated here as part of the method are not limited to the particular chronological order. Indeed, some of the blocks may be performed in a different order than what is shown and/or at least some of the blocks shown can occur simultaneously.

Figure 4:
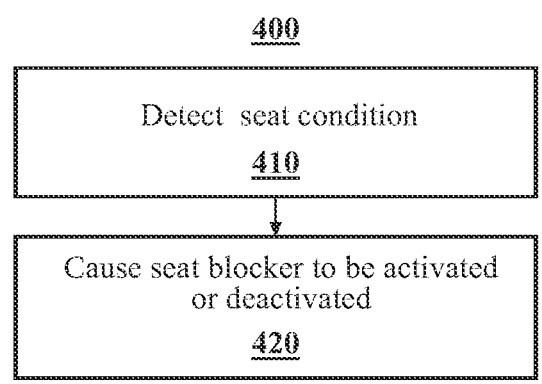
FIG. 4 is an example of a method of blocking a seat.

Referring to FIG. 4, an example of a method 400 is shown. At block 410, a seat condition can be detected. As described herein, the seat condition can a clean condition, an unclean condition, an un-reserved condition, or a reserved condition. The detection can be performed by the computing device 38 and/or the module. The method 400 can continue to block 420. At block 420, responsive to the detected seat condition, the seat blocker 26 can be caused to be activated or deactivated based on the seat condition. The causing can be performed by the computing device 38 and/or the module. The method can return to block 410 or proceed to some other block.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A seat blocking system, comprising:
   a seat, the seat including a seat understructure and an overlying seating surface, the seat understructure forming a seat base and a seatback arranged in a seating configuration, and the seating surface configured to morph between a sittable shape, in which the seating surface is coextensive with the seat understructure, and an unsittable shape, in which the seating surface is expanded over at least a portion of the seat understructure; and
   a seat blocker integrated with the seat, the seat blocker operable to morph between a deactivated state, whereby the seat blocker leaves the seat understructure to impart the sittable shape to the seating surface, and an activated state, in which the seat blocker acts on the seating surface to impart the unsittable shape to the seating surface.

2. The seat blocking system of claim 1, wherein the seat blocker includes at least one actuator integrated with the seating surface, and wherein operating the seat blocker to morph between the deactivated state and the activated state includes operating the actuator to act on the seating surface to impart the unsittable shape to the seating surface.

3. The seat blocking system of claim 2, wherein the at least one actuator is configured to be actuated by a bending action, wherein the bending action imparts the unsittable shape to the seating surface.

4. The seat blocking system of claim 3, wherein the at least one actuator is arranged in a doubled-over shape longitudinally along at least one of the seat base and the seatback, and wherein, through the bending action, the at least one actuator is configured to morph between the doubled-over shape and an L-shape, wherein the L-shape imparts the unsittable shape to the seating surface.

5. The seat blocking system of claim 3, wherein the at least one actuator is arranged in a substantially straight shape transversally across at least one of the seat base and the seatback, and wherein, through the bending action, the at least one actuator is configured to morph to a V-shape, wherein the V-shape imparts the unsittable shape to the seating surface.

6. The seat blocking system of claim 2, wherein at least a portion of the at least one actuator is at least one of a shape memory alloy, an electroactive polymer, a liquid crystal elastomer, a pneumatic actuator, and a hydraulically amplified self-healing electrostatic actuator.

7. The seat blocking system of claim 1, further comprising:
   at least one computing device operatively connected to the seat blocker, the at least one computing device configured to identify a seat condition indicative of whether the seat should be blocked, and, responsive to identifying the seat condition, operate the seat blocker to morph between the deactivated state and the activated state.

8. The seat blocking system of claim 7, wherein the at least one computing device is configured to transmit at least one seat condition to a central control center.

9. The seat blocking system of claim 7, wherein identifying a seat condition indicative of whether the seat should be blocked includes identifying at least one of an unclean condition and a reserved condition, and wherein operating the seat blocker to morph between the deactivated state and the activated state includes at least one of operating the seat blocker to morph from the deactivated state to the activated state and, when the seat blocker is in the activated state, operating the seat blocker to remain in the activated state.

10. The seat blocking system of claim 7, wherein identifying a seat condition indicative of whether the seat should be blocked includes identifying at least one of a clean condition and an un-reserved condition, and wherein operating the seat blocker to morph between the deactivated state and the activated state includes at least one of operating the seat blocker to morph from the activated state to the deactivated state and, when the seat blocker is in the deactivated state, not operating the seat blocker.

11. The seat blocking system of claim 9, wherein the seat blocker is operated to morph from the activated state to the deactivated state in response to identification of a person holding a seat reservation, where the person holding a seat reservation is identified based on at least one of proximity to the seat of a mobile device associated with the person and face recognition of the person holding the seat reservation.

12. The seat blocking system of claim 1, wherein the seat is a vehicle seat.

\* \* \* \* \*